United States Patent
Harrison et al.

(10) Patent No.: US 12,291,313 B1
(45) Date of Patent: May 6, 2025

(54) FREESTANDING STORAGE RACK PREFERABLY FOR OUTDOOR STORAGE OF A PLURALITY OF WATERCRAFT

(71) Applicants: James V. Harrison, Fort Lauderdale, FL (US); Justin V. Harrison, Fort Lauderdale, FL (US)

(72) Inventors: James V. Harrison, Fort Lauderdale, FL (US); Justin V. Harrison, Fort Lauderdale, FL (US)

(*) Notice: Subject to any disclaimer, the term of this patent is extended or adjusted under 35 U.S.C. 154(b) by 0 days.

(21) Appl. No.: 18/742,195

(22) Filed: Jun. 13, 2024

(51) Int. Cl.
*B63B 32/83* (2020.01)
*B63B 34/26* (2020.01)
*B60P 1/52* (2006.01)
*B63C 15/00* (2006.01)

(52) U.S. Cl.
CPC .............. *B63B 32/83* (2020.02); *B63B 34/26* (2020.02); *B60P 1/52* (2013.01); *B63C 15/00* (2013.01)

(58) Field of Classification Search
CPC ......... B63B 32/83; B63B 34/26; B63C 15/00; B60P 1/52; F26B 25/20; F26B 25/185
See application file for complete search history.

(56) References Cited

U.S. PATENT DOCUMENTS

| | | | | |
|---|---|---|---|---|
| 3,567,035 A | * | 3/1971 | Dudzik | F16B 7/0493 211/175 |
| 3,684,285 A | * | 8/1972 | Kane | A63F 3/02 D21/336 |
| 3,742,534 A | * | 7/1973 | Guest | B63C 15/00 114/344 |
| 5,595,312 A | * | 1/1997 | Dardashti | A47B 96/06 211/41.12 |
| 6,669,213 B2 | * | 12/2003 | Woerner | B62B 3/002 280/47.35 |
| 7,201,282 B1 | | 4/2007 | Alderman | |
| 7,540,510 B2 | * | 6/2009 | Sparkowski | A47F 5/137 248/128 |
| 7,896,175 B1 | | 3/2011 | Corr | |
| 8,002,126 B1 | | 8/2011 | Drum | |
| 8,066,267 B2 | * | 11/2011 | Schaerer | F26B 25/18 269/296 |
| 10,118,678 B2 | | 11/2018 | Dias | |
| 10,314,395 B2 | * | 6/2019 | McGhee, III | A47B 47/028 |
| D918,627 S | | 5/2021 | Perrotti, Jr. | |
| 11,590,401 B2 | | 2/2023 | Teasdale | |

(Continued)

*Primary Examiner* — Ko H Chan
(74) *Attorney, Agent, or Firm* — DANIEL S. POLLEY, P.A.

(57) ABSTRACT

A freestanding outdoor storage rack which allows a single person to load and unload a watercraft onto a designated area or slot of the storage rack. The storage rack can comprise support side panels having openings therethrough for receipt of arm bars that can extend the intended length of the storage rack. Exterior tube rollers can be disposed over the various storage sections of the arm bars as defined by the location of the support side panels. The rollers assist in loading the watercraft, such that elderly or other physically comprised individuals can load and unload a watercraft on their own by placing the bow end of the watercraft on a forward/front exterior roller of the intended storage slot. The person can then go to the opposite end of the watercraft and with rolling assistance provided by the forward roller, move the watercraft back forward such that the bow end reaches and rests on a back exterior roller of the storage slot.

20 Claims, 12 Drawing Sheets

(56) References Cited

U.S. PATENT DOCUMENTS

| | | | |
|---|---|---|---|
| 2003/0164347 A1* | 9/2003 | Bouvier, Jr. | B63B 32/83 |
| | | | 211/187 |
| 2003/0178382 A1 | 9/2003 | Tucker | |
| 2016/0135594 A1 | 5/2016 | Anderson | |
| 2018/0147970 A1* | 5/2018 | Lasley | B63C 15/00 |
| 2018/0257748 A1* | 9/2018 | Gugin | A63B 71/0036 |
| 2023/0173991 A1* | 6/2023 | Warn | B60P 3/1066 |
| | | | 414/462 |

* cited by examiner

FREESTANDING STORAGE RACK PREFERABLY FOR OUTDOOR STORAGE OF A PLURALITY OF WATERCRAFT

TECHNICAL FIELD OF THE DISCLOSURE

The disclosure relates generally to storage racks and more particularly to storage racks for outdoor use with various types of watercraft, including, without limitation, kayaks, stand up paddleboards, canoes and surfboards.

BACKGROUND OF THE DISCLOSURE

Prior outdoor storage racks merely provide a stand/surface for resting outdoor watercraft. As these prior racks do not assist in loading the watercraft on the rack, and the fact that prior designs load the watercraft from the side of the rack, at least two persons are typically required in order to raise the entire watercraft up on to the designated slot/storage area of the rack. The below disclosed novel storage rack of the current disclosure overcomes these current difficulties and other issues with outdoor storage racks.

SUMMARY OF THE DISCLOSURE

A novel freestanding outdoor storage rack is disclosed which allows for a single person to easily and safely load their watercraft onto a designated area or slot of the novel storage rack. Though not considered limiting, for purposes of this disclosure "watercraft" can be defined to include kayaks, stand up paddleboards ("SUPs"), canoes, surfboards, other similar sized watercraft and personal watercraft and similar types of sporting equipment that may be developed in the future.

The outdoor storage rack can comprise support side panels having openings therethrough for receipt of arm bars that can extend the intended length of the outdoor storage rack. Exterior rollers (which can be tubes) can be disposed over the various storage sections of the arm bars as defined by the location of the support side panels. By placing the exterior rollers over the arm bars, the rollers assist in loading the watercraft, such that elderly or other physically comprised individuals can store the watercraft on their own without the need of assistance from another individual. Preferably, the bow end of the watercraft (though the opposite end can also be used and considered within the scope of the disclosure) and set on a forward/front exterior roller of the intended storage slot. The person can then go to the opposite (i.e. aft) end of the watercraft and with rolling assistance provided by the forward roller, move the watercraft back forward (i.e. within/into the storage rack) such that the bow end of the watercraft reaches and rests on a back exterior roller of the storage slot.

The exterior rollers of the specific slot where the watercraft is stored similarly assist in allowing a single individual to remove the watercraft preferably by performing a reverse procedure as described above when loading the watercraft for storage. The disclosed novel storage rack can be designed to flex for ease from loading the watercraft on and off the rack. Preferably, when the watercraft is loaded onto the rack, the rack can stiffen for stability.

DETAILED DESCRIPTION

Figure 1:
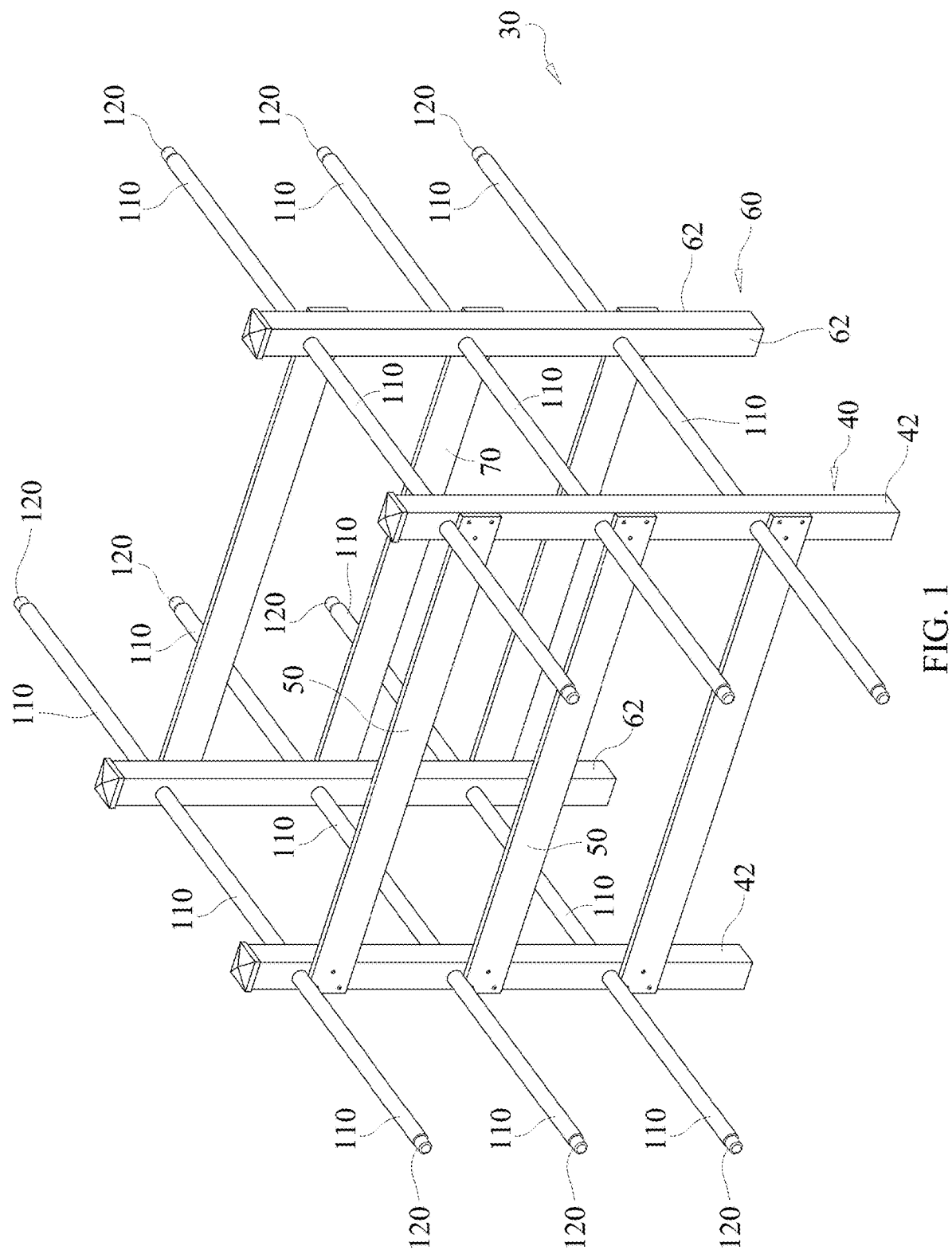
FIG. 1 is a perspective view of a first, non-limiting, embodiment for a novel outdoor watercraft storage rack in accordance with the current disclosure.
Figure 2:
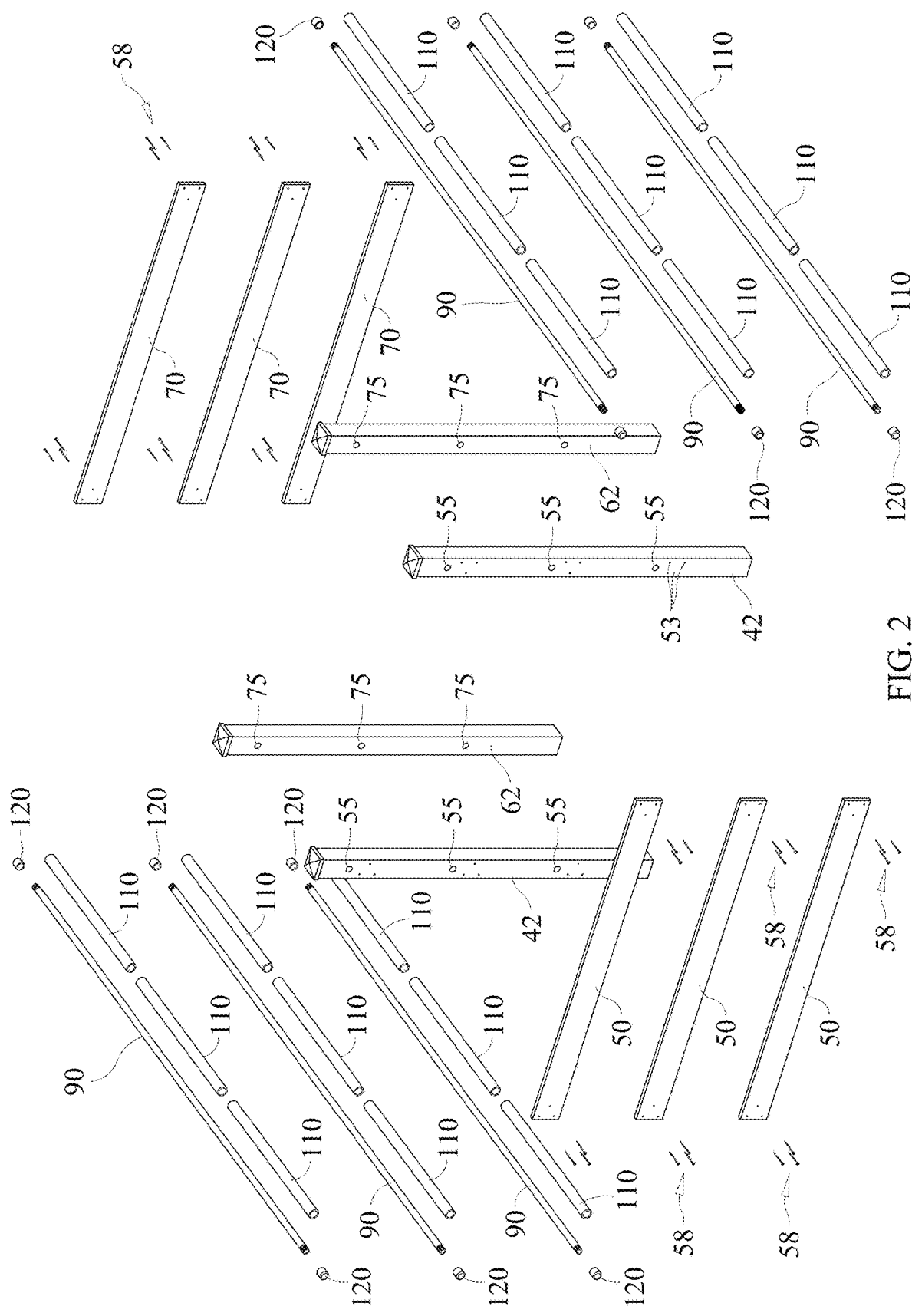
FIG. 2 is a perspective view of a partially assembled, partially exploded of the storage rack of FIG. 1.

As seen in FIG. 1 a first non-limiting embodiment for the novel storage rack is shown and generally designated as storage rack 30. In this embodiment, storage rack 30 can include a first side frame 40 and a second side frame 60. A plurality of arm bars 90 can be provided and extend through both first side frame 40 and second side frame 60, preferably at a sufficient length such that a plurality of watercraft storage areas can be provided to the left of first side frame 40, to the right of second side frame 60 and in between first side frame 40 and second side frame 60. A plurality of exterior tubes 110 serving as rollers for ease of loading and unloading of the watercraft on or off storage rack 30 can be provided and are disposed over the storage sections of arm bars 90 as divided and defined by the locations of first side frame 40 and second side frame 60.

Figure 3:
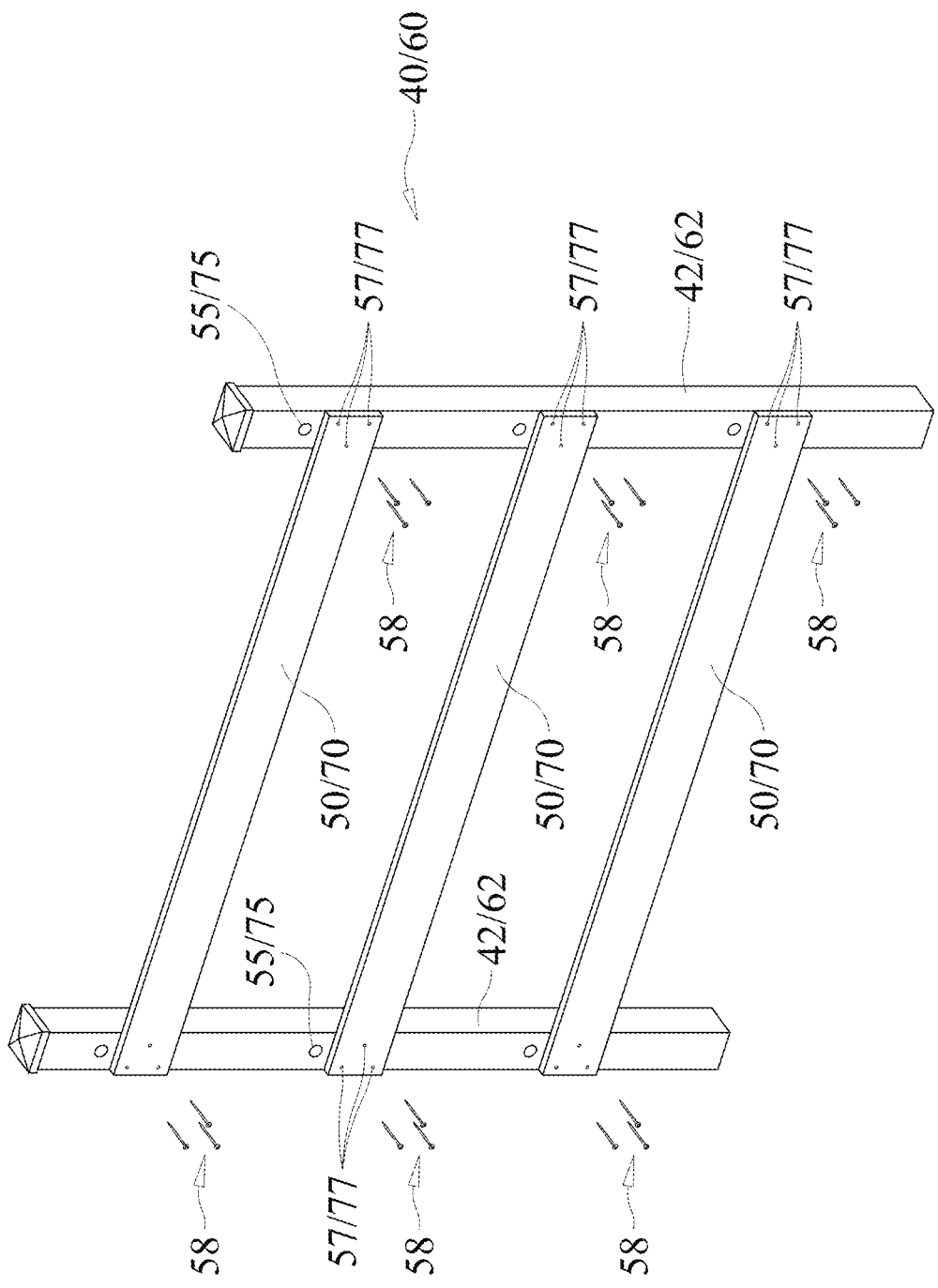
FIG. 3 is a perspective of a side frame member for the storage rack of FIG. 1 showing the horizontally plank members about to be secured to associated vertical posts through the use of fastening members, which can include, but are not limited to, a plurality of lag screws.

As best seen in FIG. 3, side frame 40 can comprise a pair of vertically oriented post members 42 and a plurality of horizontally oriented plank members 50. Preferably three plank members 50 can be provided, though such number is not considered limiting, and more or less than three plank members 50 can also be used and are considered within the scope of the disclosure. Each post member 42 can have a plurality of holes 53 and each plank member 50 can have one or more holes 57 disposed at or adjacent to each end of plank member 50. When securing plank member 50 to the pair of post members 42, holes 57 on one end of plank member 50 can be aligned with associated holes 53 of one of the post members 42 and holes 57 on the opposite end of plank member 50 can be aligned with associated holes 53 of the other (i.e. second) post member 42. Though not limiting, preferably line up nails can be provided for lining up each of the plank member 50 at the correct locations along the post members 42 and once lined up, the nails can be replaced with fastening members, which in a preferred embodiment can be a plurality of lag screws 58, though other fastening members can also be used and considered within the scope of the disclosure. Each post member 42 can also be provided with a plurality of openings/apertures 55 extending therethrough for receipt of and insertion therethrough of a specific one arm bar 90 of either the first plurality of arm bars (preferably associated with the back of storage rack 30) or the second plurality of arm bars (preferably associated with the front of storage rack 30).

Second side frame 60 can comprise a pair of vertically oriented post members 62 and a plurality of horizontally oriented plank members 70 which can be preferably identical or the same as post members 42 and plank members 50 of first side frame 40. Second side frame and can be fastened/secured together the same as described above for first side frame 40 (i.e. plank members 70 have holes 77 on each end) and the description and securement method for first side frame 40 is incorporated by reference for securement of second side frame 60.

Each post member 42 can also be provided with a plurality of openings/apertures 55 extending therethrough for receipt of and insertion therethrough of a specific one arm bar 90 of either the first plurality of arm bars (preferably associated with the back of storage rack 30) or the second plurality of arm bars (preferably associated with the front of storage rack 30). Similarly, each post member 62 can also be provided with a similar or same plurality of openings/apertures 75 as openings/apertures 55 for the same purpose of receipt and insertion therethrough of arm bars 90.

Figure 4:
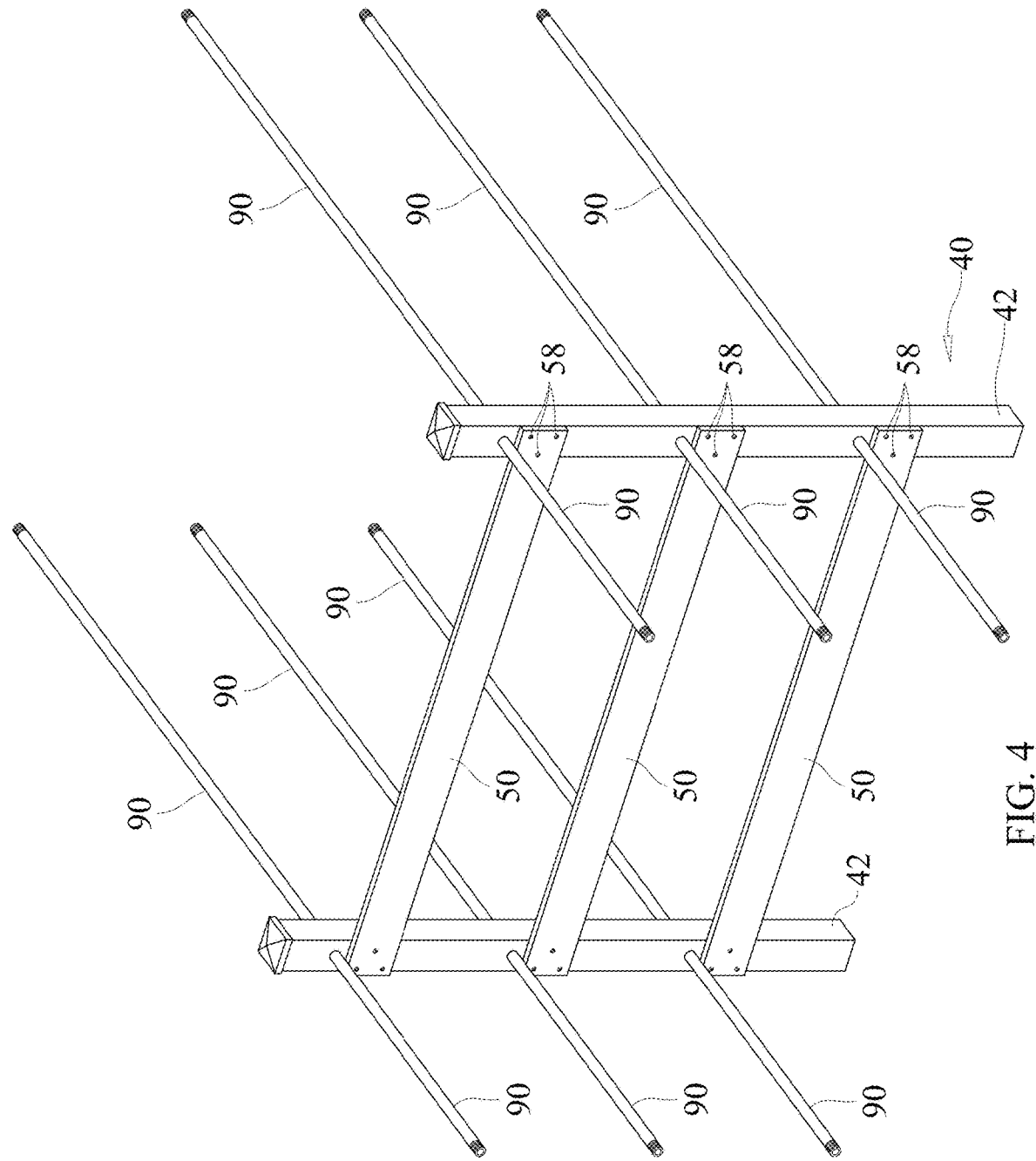
FIG. 4 is a perspective view showing a plurality of arm bars inserted through openings provided in the side frame member shown in FIG. 3.
Figure 5:
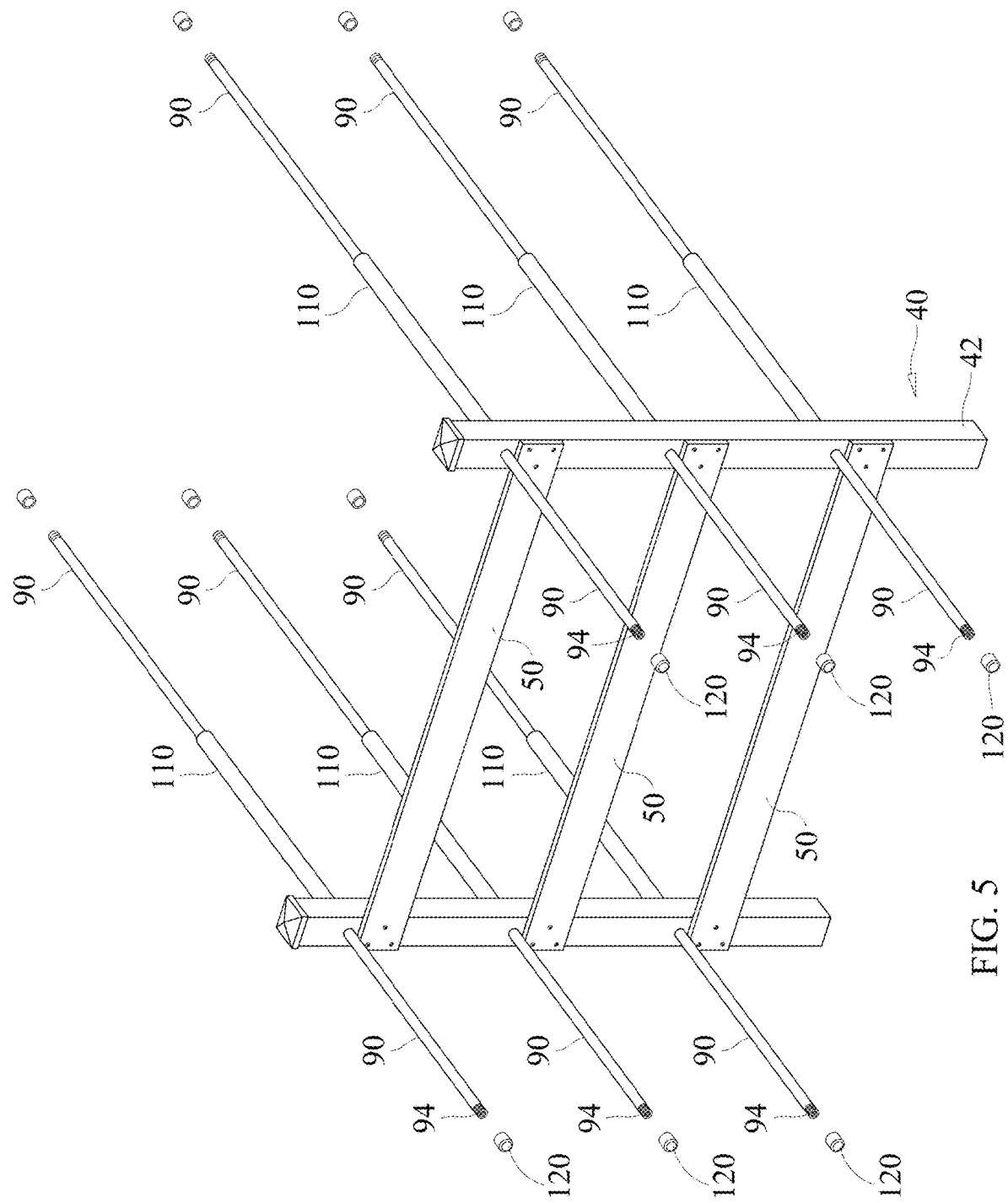
FIG. 5 is a perspective view showing the exterior rollers slid or disposed over middle portions of their associated arms bars of the partially assembled storage rack shown in FIG. 4.
Figure 6:
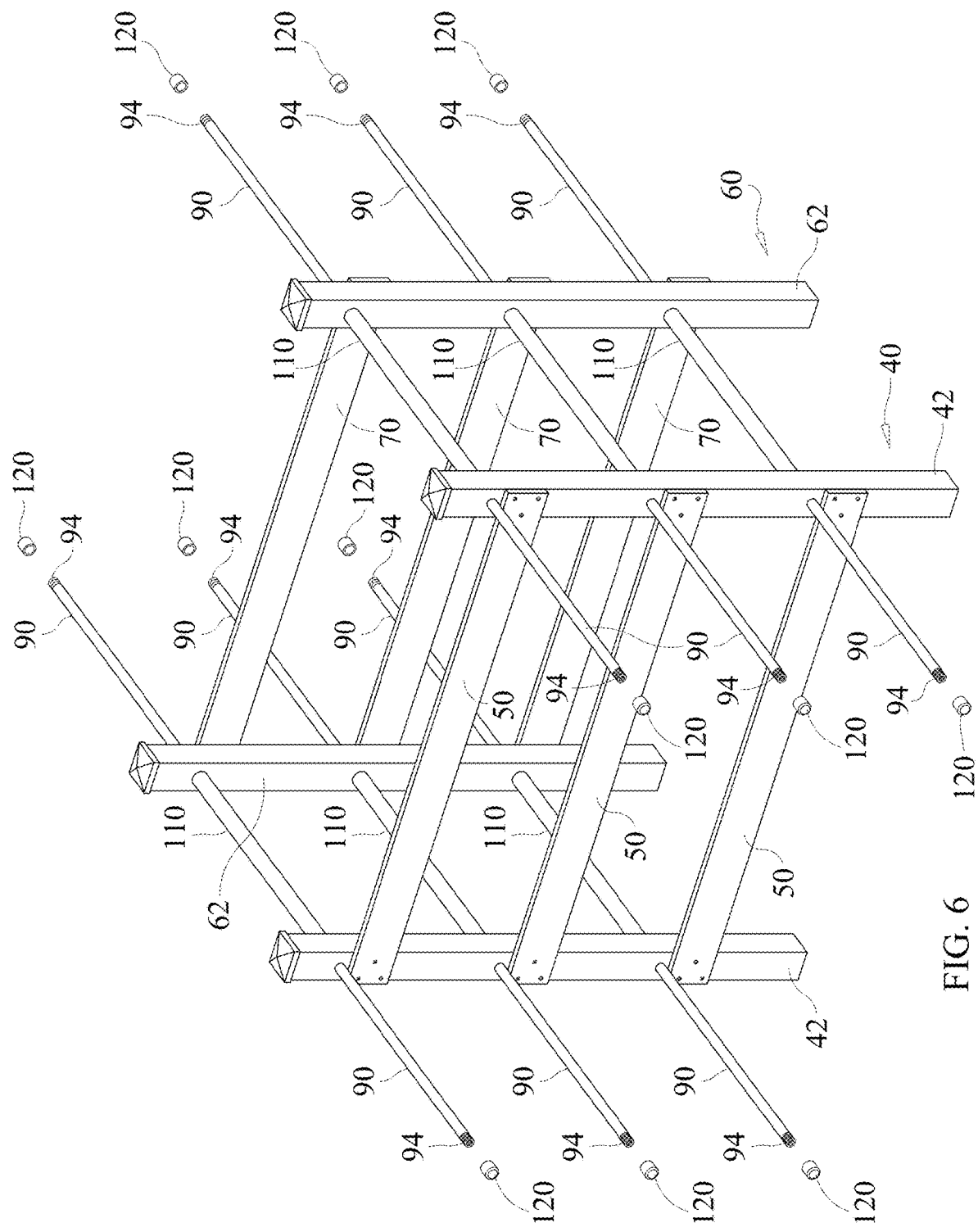
FIG. 6 is a perspective view of a second side frame member secured to the arm bar on an opposite end of the middle exterior rollers shown in FIG. 5.

As seen in FIG. 4, with side frame 40 fully assembled, arm bars 90 can be inserted through their designated openings 55 in post members 42. FIG. 5 illustrates that outer rotating exterior tubes 110 can then be slid onto designed arm bars 90 and positioned such that they are disposed over the middle/intermediate sections of the arm bars 90 such that a first end of the middle section outer tubes 110 abuts or can be adjacent/near to an inwardly positioned outer surface of post members 42. FIG. 6 illustrates second side frame 60 being secured by insertion of arm bars 90 through openings 75 on the post members 62. Preferably, second side frame 60 can be slid along arm bars 90 to a position where a second end of the middle section outer tubes 110 abuts or can be adjacent/near to an inwardly positioned outer surface of post members 62.

Figure 7:
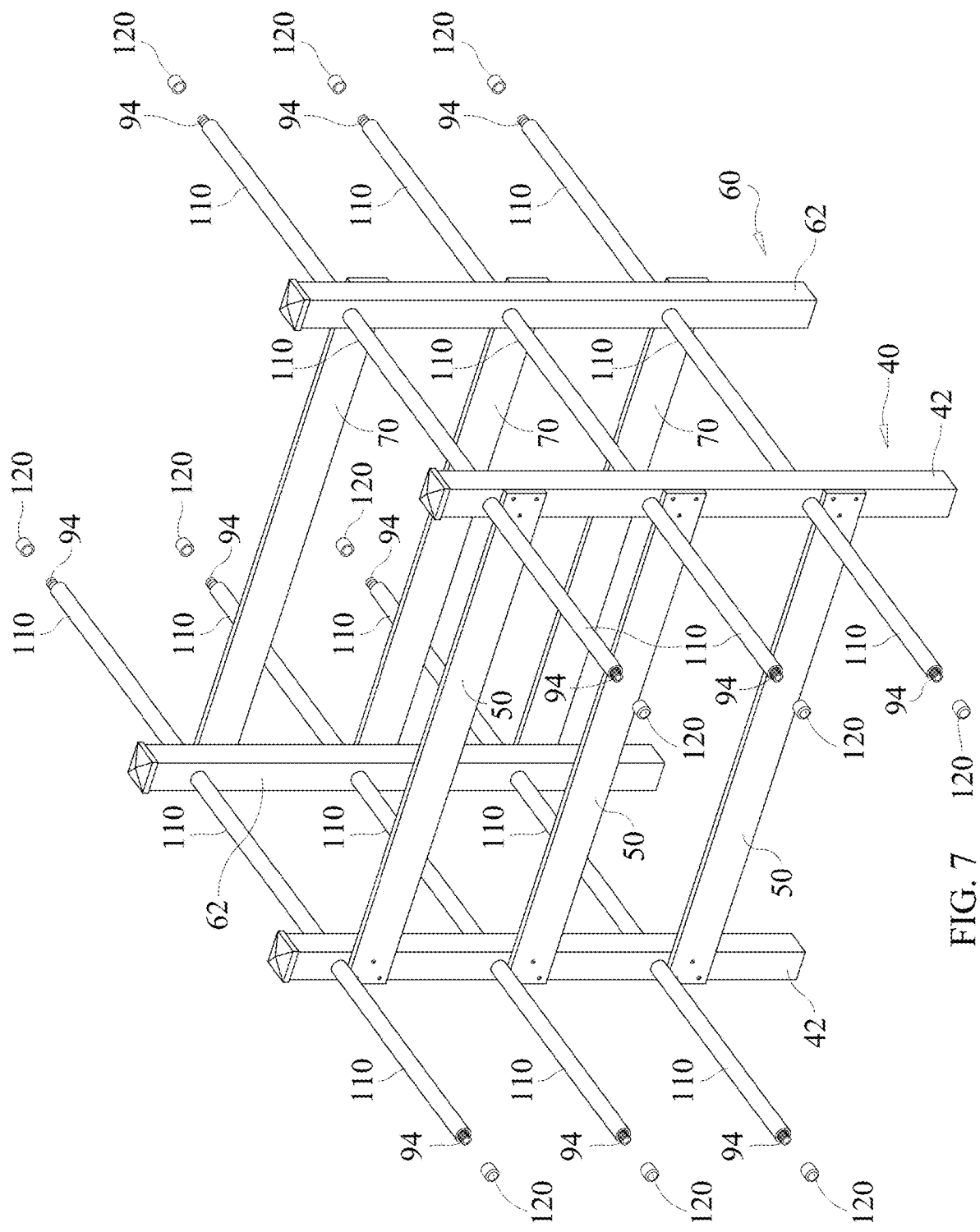
FIG. 7 is a perspective of the partially assembly storage rack shown in FIG. 6 with the side exterior rollers slid or disposed over the side portions of their associated arm bars such that an inner end of the side exterior rollers abuts or is adjacent to a correspond vertical post and an outer end (preferably threaded) of the arm bars are visible and accessible and extend beyond the outer end of the side exterior rollers for securement of associated end caps seen in FIG. 6.
Figure 11:
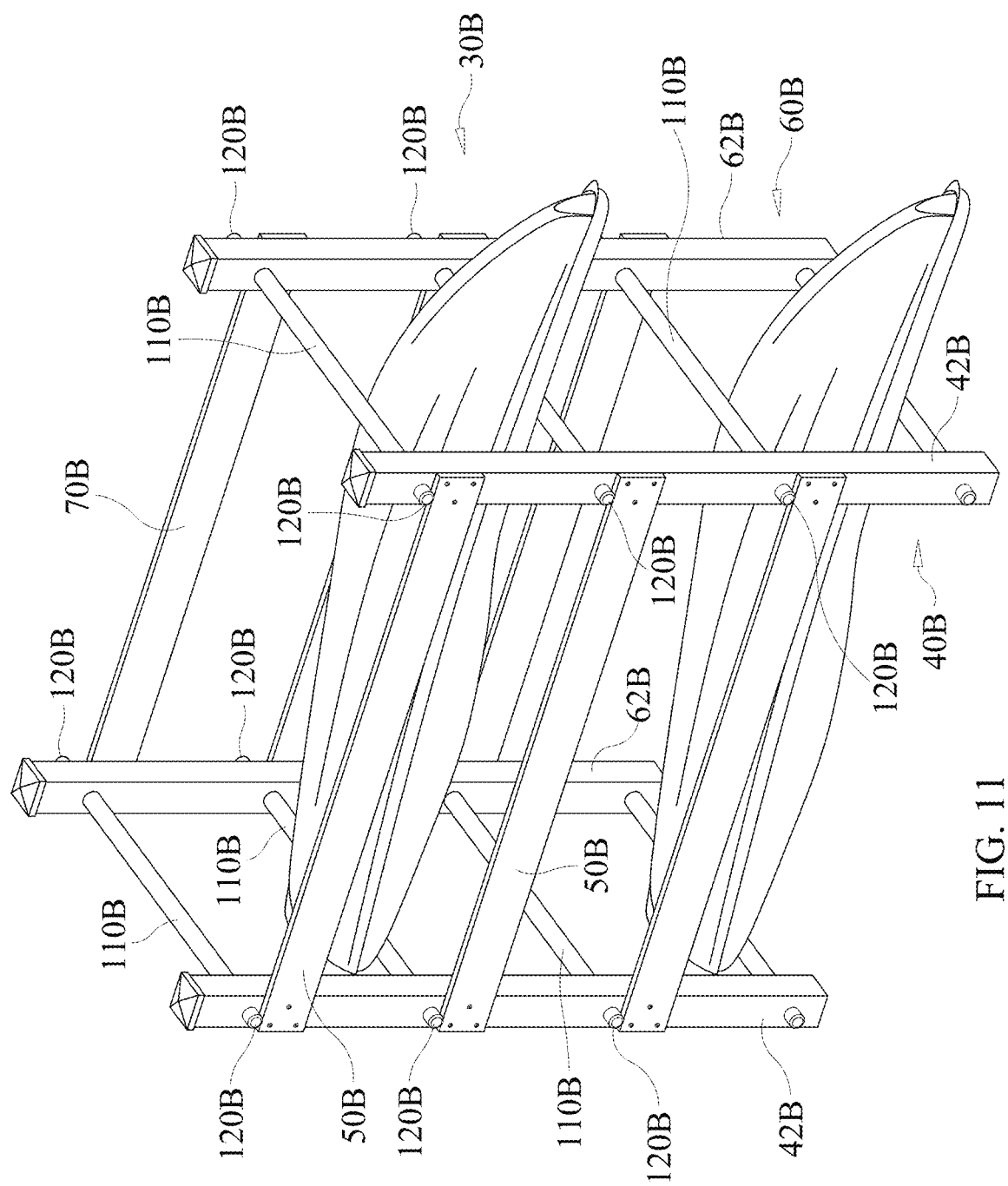
FIG. 11 is a perspective of a third, non-limiting, embodiment for the novel storage rack in accordance with the present disclosure.

In this first embodiment, as well as the embodiment shown in FIG. 11, in addition to the storage spaces between first side frame 40 and second side frame 60, arm bars 90 can extend outward from first side frame 40 at a sufficient distance/length to define storage spaces to the left of first side frame 40 and outward from second side frame 60 at a sufficient distance/length to define storage spaces to the right of second side frame 60 when a viewer is at a position looking straight at the front of storage rack 30. As seen in FIG. 7, a plurality of outer rotating tubes 110 can be slid onto and positioned over the left side portions of arm bars 90 such that an inner end of the left side outer rotating tubes 110 abuts or can be adjacent/near to an outwardly positioned outer surface of post members 42 and a plurality of outer rotating tubes 110 can be slid onto and positioned over the right side portion of arm bars 90 such that an inner end of the right side outer rotating tubes abuts or can be adjacent/near to an outwardly positioned outer surface of post members 62. Similarly to the middle outer tubes 110, the left side outer tubes 110 and the right side outer tubes can be preferably freely rotating with respect to their associated arm bar 90 that they are slid onto.

As also seen in FIG. 7, with the left side outer tubes 110 properly positioned the left or first end of arm bars 90 preferably extend outward from the outer end of the left side outer tubes 110 for securement of an end cap 120 on each (discussed in more detail in FIGS. 8A-8D) which can aid in retaining the left side outer tubes 110 in position on arm bars 90. Similarly, with the right-side outer tubes 110 properly positioned the right or second end of arm bars 90 preferably extend outward from the outer end of the rightside outer tubes 110 for securement of an end cap 120 on each (discussed in more detail in FIGS. 8A-8B) which can aid in retaining the right side outer tubes 110 in position on arm bars 90.

Figure 8A:
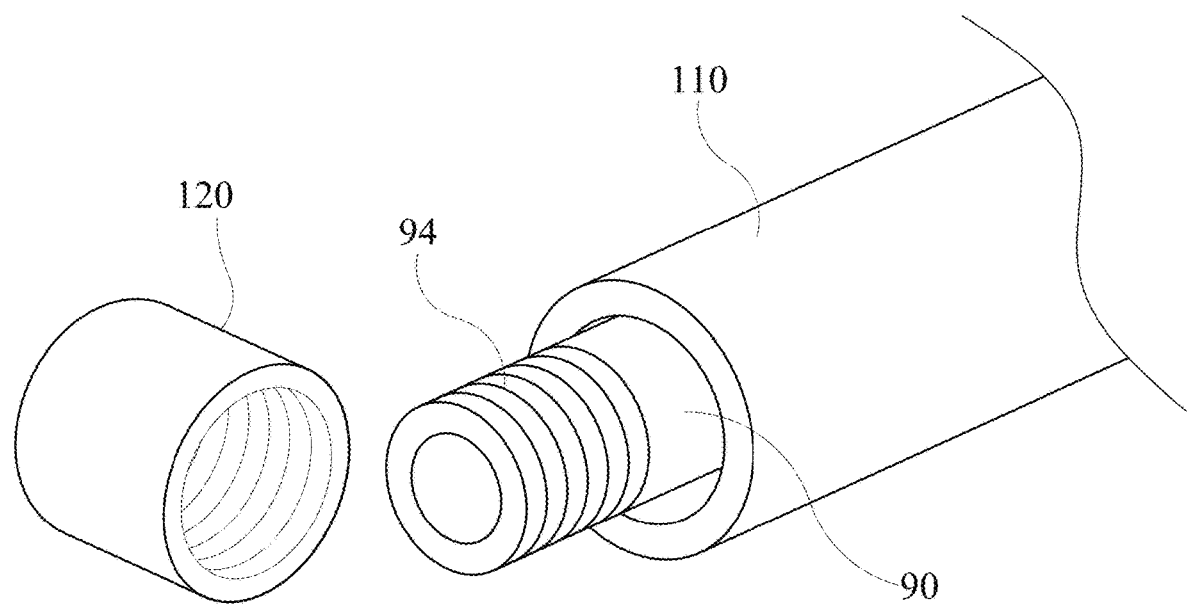
FIG. 8A is a close-up perspective view showing an outer end of an arm bar protruding outward from an outer end of a side exterior roller and illustrating the preferred threads at the end of the arm bar and also within the end cap for mating the end cap at the end of the arm bar in accordance with the present disclosure.
Figure 8B:
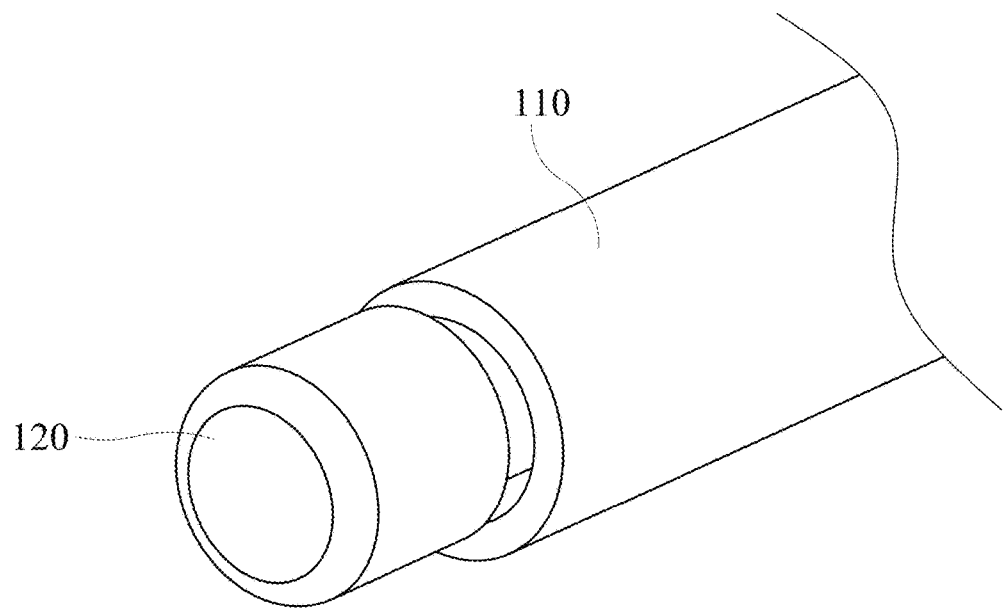
FIG. 8B is a close-up perspective view showing the associated end cap secured to outer end of the arm bar preferably, though not limiting, by mating internal threads of the end cap with the exposed threads of the arm bar that were visible in FIG. 8A.

As also seen in FIG. 7 and better seen in FIG. 8A, each end of arm bar 90 can be threaded (i.e. threads 94) for mating with internal threads preferably contained within an associated end cap 120. Though the threaded securement relationship can be the preferred fastening mechanism for securing end caps 120 onto the ends of arm bars 90, other fastening methods can also be used and provided and considered within the scope of the disclosure, which can include, without limitation, having a tight/friction fit between the outer diameter at the end of the arm bar (i.e. which could also result in not needing threads at the ends of arm bar 90) and the inner diameter of the opening within end cap 120. With any chosen fastening securement mechanism, once end caps 120 are properly secured at the ends of arm bars 90 they can serve as blocking members (See FIG. 8B) for maintaining the position of the left side outer tubes 110 and the right-side outer tubes 110 on associated arm bars 90.

Figure 8C:
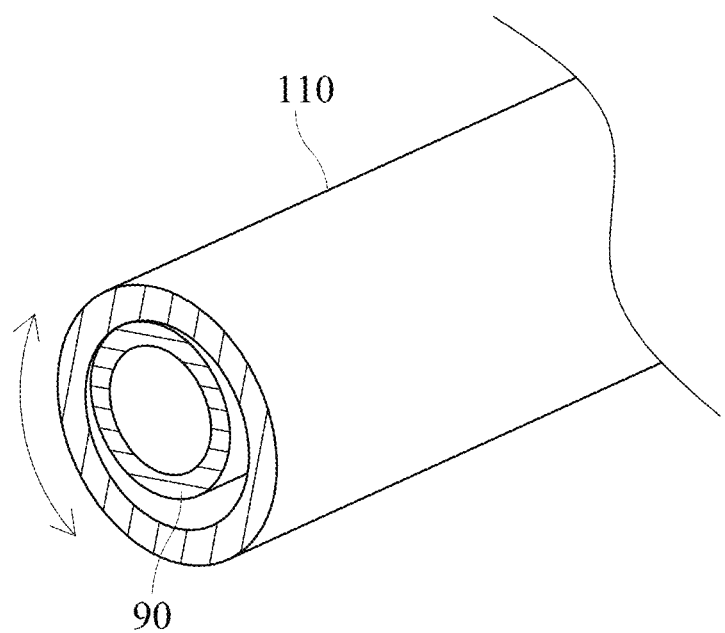
FIG. 8C is a sectional view of an arm bar and associated outer exterior roller showing the freely rotating capabilities of the exterior roller with respect to the arm bar.

FIG. 8C provides for a cutaway of a portion of arm bar 90 and outer tube 110 to illustrate the freely rotating relationship between arm bar 90 and outer tube 110.

Figure 9:
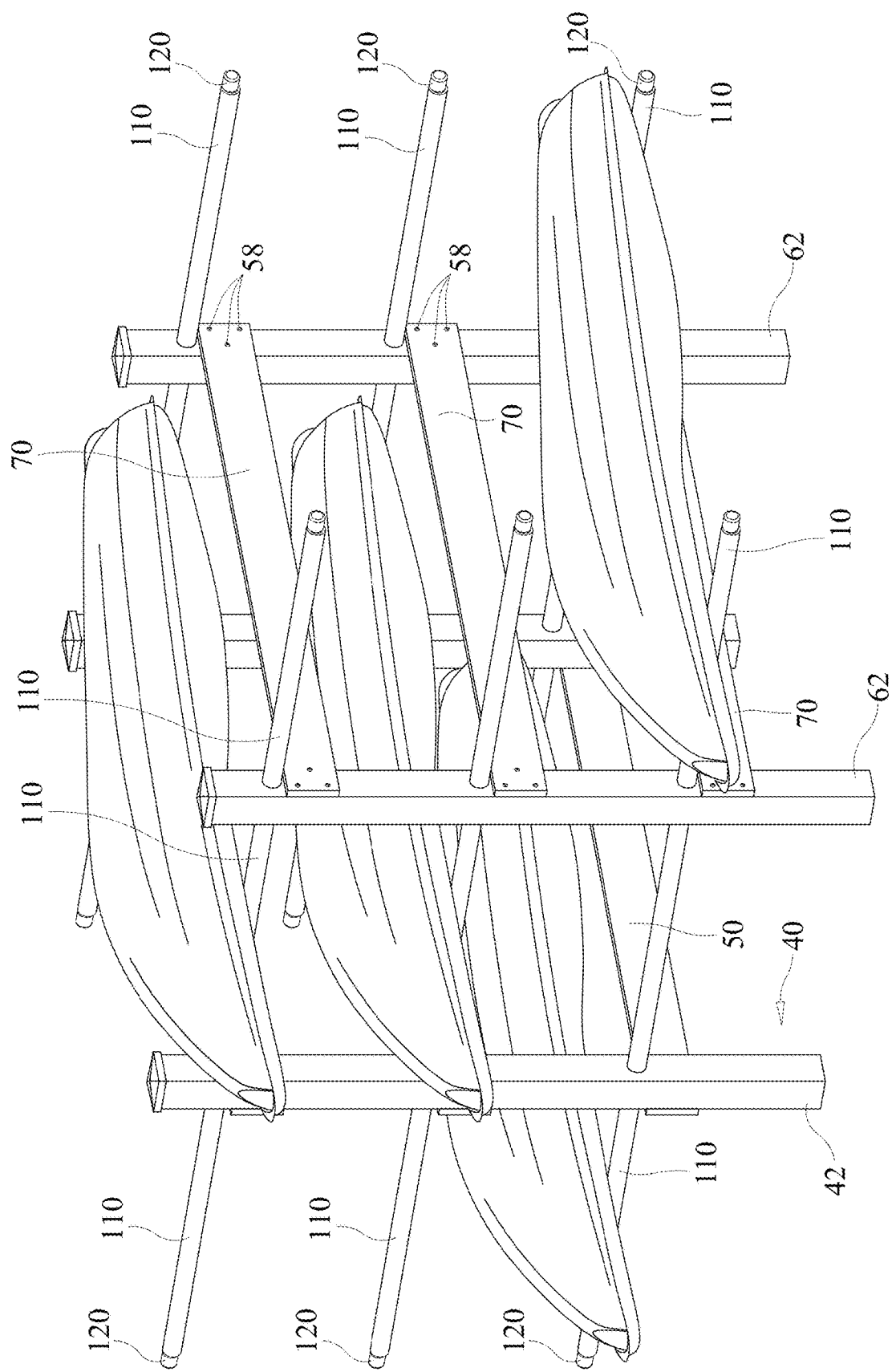
FIG. 9 is a perspective view of the first embodiment for the novel storage rack shown storing a plurality of watercraft.
Figure 10:
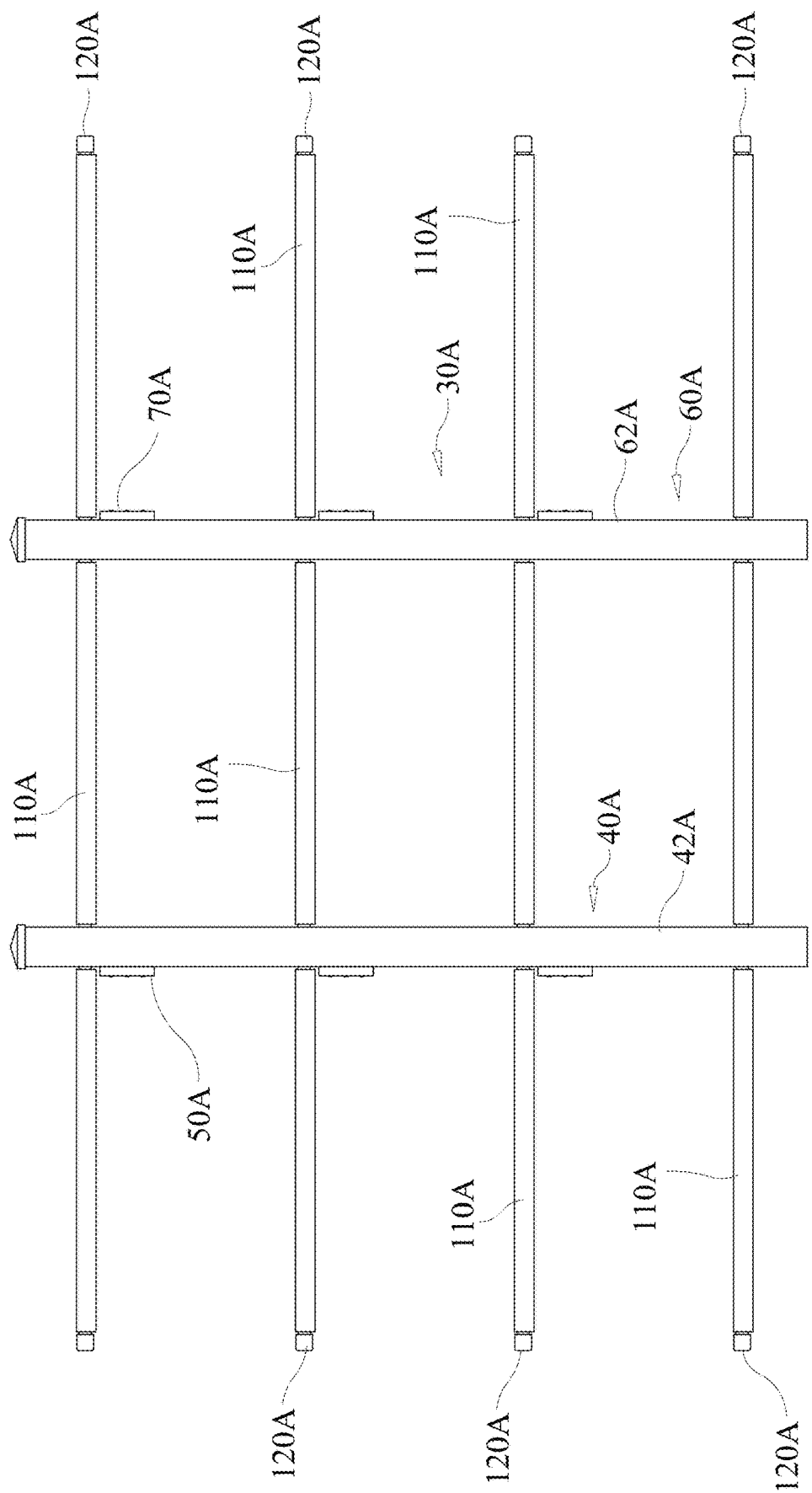
FIG. 10 is perspective view of a second, non-limiting, embodiment for the novel storage rack in accordance with the present disclosure.

FIG. 9 illustrates the first embodiment of storage rack 30 being used for securing a plurality of watercraft. In this embodiment, storage rack 30 can be designed or configured to store up to nine watercrafts. FIG. 10 illustrates a second embodiment which is identified as storage rack 30A and incorporates similar components as the components from storage rack 30, such that similar numbering is used and followed by the letter A (i.e. outer tubes 110A, post 42A, post 62A, plank 50A, plank 70A, etc.). In this embodiment, an extra row of storage spaces is created at the bottom of storage rack 30A by the addition of two additional arm bars 90A that are inserted through first side frame 40A and second side frame 60A and their associated end caps 120A. FIG. 11 illustrates a third embodiment, which can be considered a "mini" or "miniature" storage rack 30B embodiment, as compared to storage rack embodiments 30 and 30A. It should be understood that the novel storage rack disclosed herein is not limited to any particular number of storage spaces, rows of storage spaces, columns of storage spaces, nor is it limited to only two side frames. As a non-limiting example, a novel storage rack encompassing some or all of the features and benefits described above for storage rack 30 can be provided with longer in length arm bars 90, such that three or more side frames can be provided and create additional divided storage sections/spaces. Thus, with repositioning or reorganizing at least some of the parts, or with adding or subtracting the number of at least some of the parts provided for the rack (as compared to storage rack 30) and/or reducing or enlarging the size of at least some of the parts (as compared to storage rack 30), novel storage racks of various storage space/slots capacities can be provided and all configurations are considered within the scope of the disclosure. Furthermore, multiple storage racks (of the same embodiment or of more than one of the embodiments) can be positioned next to each other (i.e., side by side) to further enlarge the storage space/slot capacity at a single location. Where side by side, the arm bars or end caps from the first storage rack preferably can be touching adjacent arm bars or end caps from the second storage rack.

Preferably, the end caps can be tightened at the ends of the arm bars when they are secured thereto so as to stiffen the frame of storage rack 30, 30A and/or 30B. The arm bars can be made from steel pipe which preferably can be galvanized steel pipe. However, other rigid and relatively strong (i.e. support the weight of a stored watercraft) materials (preferably capable of withstanding outdoor environments) can also be used for the arm bars and all are considered within the scope of the disclosure. Dry silicone or similar function materials/compositions can be sprayed at the ends of the arm bars. As noted above, preferably the disclosed novel storage racks can be free standing and designed/configured to flex for ease from loading watercraft on and off the racks created by the arm bars/outer tubes. When a watercraft is loaded onto a designated space of the novel storage rack, the rack can stiffen for stability. The outer tubes, preferably serving as PVC rollers, can preferably roll/rotate around its associated arm bar with a little bit of drag. It is preferred, though not limiting, that the arm bars can be preferably hidden between the preferred PVC end caps and the posts of the side frames.

As the storage racks are preferably used outdoors and are preferably freestanding, where a storm or other natural disaster is expected (e.g. hurricane, etc.), the storage should be moved indoors or to another safe location until the storm passes and the storage racks are preferably disassembled. However, another advantage of the of disclosed storage racks is that once they have been assembled once, for disassembly the two side frames (40/40A/40B and 60/60A/60B) can remain fully assembled (i.e. posts and plank member stay secured). Therefore, for disassembly the end caps are removed (i.e. unscrewed where the securement is threaded) and the arm bars are slid out and the outer rotating tubes are also released. For reassembly, the arm bars and rollers are assembled as described above and the end caps are secured as also described above. 9 As such, a significant time savings can be achieved for disassembling the storage rack such as in an emergency situation and for reassembling the storage rack after the emergency situation has passed. Though not considered limiting, disassembly can take approximately 10 minutes for two persons and similarly can also take approximately 10 minutes for two for reassembly.

Additionally, depending on the size of the watercraft to be stored, more than one of such watercrafts may be able to be stored in a single designated storage space/slot for the novel storage rack disclosed herein.

Though not considered limiting, the side frames can be constructed out of 4×4 treated wood (e.g. pine wood, etc.), which can be preferably coated, such as, but not limited to, a white exterior PVC coating for the posts and the planks (side panels) can be ¾"×6"×6' PVC panels/planks, though again as a preferred, but not limiting, size and material. In one embodiment, the arm bars can be 10-foot in length, though such length is not considered limiting.

Though not shown, a canvas, tarp, mesh covering, etc. can also be provided to cover the storage rack and provided protection to the storage rack and any stored watercraft from the sun, rain, and other environmental elements. Locks/cables can also be provided for securing the stored watercraft to the storage rack for theft prevention or at least reducing theft of the stored watercraft. Furthermore, though preferably for constructed for outdoor use and to withstand outdoor weather conditions, the disclosed novel storage racks can also be used for indoor storage of watercraft and/or other objects and such use is also considered within the scope of the disclosure.

All locations, sizes, measurements, amounts, weights, dimensions, values, percentages, materials, securement/fastening mechanisms, number of storage spaces/slots, number of a specific part/component, orientations, etc. discussed above or shown in the drawing figures are merely by way of example and are not considered limiting and other locations, sizes, measurements, amounts, weights, dimensions, values, percentages, materials, securement/fastening mechanisms, number of storage spaces/slots, number of a specific part/component, orientations etc. can be chosen and used and all are considered within the scope of the invention.

While the novel storage rack has been described and disclosed in certain terms and has disclosed certain embodiments or modifications, persons skilled in the art who have acquainted themselves with the disclosure, will appreciate that it is not necessarily limited by such terms, nor to the specific embodiments and modifications disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A freestanding storage rack for outdoor use, comprising:
   a first side frame, the first side frame having a back portion and a front portion;
   a second side frame positioned at a distance from the first side frame, the second side frame having a back portion and a front portion;
   a first plurality of arm bars inserted through both the back portion of the first side frame and the back portion of the second side frame and having a length such that a first end of each bar of the first plurality of arm bars extends outward from the first side frame and a second end of each bar of the first plurality of arm bars extends outward from the second side frame;
   wherein a middle portion of each bar of the first plurality of arm bars extends from a first inner surface of the back portion of the first side frame and a first inner surface of the back portion of the second side frame and is defined by the distance between the first side frame and the second side frame;
   a second plurality of arm bars inserted through both the front portion of the first side frame and the front portion of the second side frame and having a length such that a first end of each bar of the second plurality of arm bars extends outward from the first side frame and a second end of each bar of the second plurality of arm bars extends outward from the second side frame;

wherein a middle portion of each bar of the second plurality of arm bars extends from a first inner surface of the front portion of the first side frame and a first inner surface of the front portion of the second side frame and is defined by the distance between the first side frame and the second side frame; and a first plurality of rotating tubes, each rotating tube of the first plurality of rotating tubes disposed around and enclosing a specific middle portion of one arm bar in a freely rotating configuration from the first plurality of arm bars and serving as a freely rotating exterior roller for aiding in loading an object for storage by the storage rack, wherein a length of each rotating tube of the first plurality of rotating tubes is virtually a same length as the specific middle portion it is disposed around and enclosing;

a second plurality of rotating tubes, each rotating tube of the second plurality of rotating tubes disposed around and enclosing a specific middle portion of one arm bar in a freely rotating configuration from the second plurality of arm bars and serving as a freely rotating exterior roller for aiding in loading an object for storage by the storage rack, wherein a length of each rotating tube of the second plurality of rotating tubes is virtually a same length as the specific middle portion it is disposed around and enclosing;

wherein the object is adapted to rest on the freely rotating tube disposed around the middle portion of the one arm bar of the first plurality of arm bars and on the freely rotating tube disposed around the middle portion of the one arm bar of the second plurality of arm bars that is horizontally aligned with the one arm bar of the first plurality of arm bars; wherein each rotating tube of the first plurality of rotating tubes freely rotating around the arm bar portion it is disposed around and each rotating tube of the second plurality of rotating tubes freely rotating around the arm bar portion it is disposed around.

2. A freestanding storage rack for outdoor use, comprising:

a first side frame, the first side frame having a back portion and a front portion;

a second side frame positioned at a distance from the first side frame, the second side frame having a back portion and a front portion;

a first plurality of arm bars inserted through both the back portion of the first side frame and the back portion of the second side frame and having a length such that a first end of each bar of the first plurality of arm bars extends outward from the first side frame and a second end of each bar of the first plurality of arm bars extends outward from the second side frame;

wherein a middle portion of each bar of the first plurality of arm bars is disposed within or defined by the distance between the first side frame and the second side frame;

a second plurality of arm bars inserted through both the front portion of the first side frame and the front portion of the second side frame and having a length such that a first end of each bar of the second plurality of arm bars extends outward from the first side frame and a second end of each bar of the second plurality of arm bars extends outward from the second side frame;

wherein a middle portion of each bar of the second plurality of arm bars is disposed within or defined by the distance between the first side frame and the second side frame;

a first plurality of rotating tubes, each rotating tube of the first plurality of rotating tubes disposed over a specific middle portion of one arm bar from either the first plurality of arm bars or the second plurality of arm bars and serving as a freely rotating exterior roller for aiding in loading an object for storage by the storage rack such that the object is adapted to rest on a middle portion of an arm bar of the first plurality of arm bars and on a middle portion of an arm bar of the second plurality of arm bars that is horizontally aligned with the arm bar of the first plurality of arm bars; wherein each rotating tube of the first plurality of rotating tubes freely rotating over the arm bar portion it is disposed over; and a plurality of end caps, each end cap from the plurality of end caps is secured to either a first end or a second end of an arm bar of the first plurality of arm bars or a first end or a second end of an arm bar of the second plurality of arm bars such that each end of the first plurality of arm bars and the second plurality of arm bars are covered by an associated end cap;

wherein when the freestanding storage rack is in a fully assembled configuration the plurality of end caps are in a tightened configuration with respect to each end cap associated arm bar end and the freestanding storage rack is in a stiffened configuration.

3. The freestanding storage rack of claim 2 wherein each first end of each arm bar of the first plurality of arm bars and of each arm bar of the second plurality of arm bars is threaded and each second end of each arm bar of the first plurality of arm bars and of each arm bar of the second plurality of arm bars is threaded; wherein each end cap of the plurality of end caps having internal threads for mating with a threaded first end or a threaded second end of an associated arm bar from the first plurality of arm bars or the second plurality of arm bars.

4. The freestanding storage rack of claim 1 wherein the first side frame comprising:

a first substantially vertically oriented post serving as the back portion of the first side frame;

a second substantially vertically oriented post serving as the front portion of the first side frame;

a first one or more plank members, each plank member of the first one or more plank members having a first end fastened to the first post and a second end fastened to the second post such that each plank member of the first one or more plank members is virtually horizontally disposed and virtually positioned parallel to the other plank members of the first one or more plank members;

wherein the first post having a plurality of openings therethrough for insertion and receipt of the first plurality of arm bars therethrough, with each arm bar of the first plurality of arm bars inserted only through a specific one of the plurality of openings of the first post;

wherein the second post having a plurality of openings therethrough for insertion and receipt of the second plurality of arm bars therethrough, with each arm bar of the second plurality of arm bars inserted only through a specific one of the plurality of openings of the second post;

wherein once the freestanding storage rack has been fully assembled in a subsequent disassembled storage rack configuration each plank member of the first one or more plank members remains fastened to the first post and the second post.

5. The freestanding storage rack of 4 wherein the second side frame comprising:
   a third substantially vertically oriented post serving as the back portion of the second side frame;
   a fourth substantially vertically oriented post serving as the front portion of the second side frame;
   a second one or more plank members, each plank member of the second one or more plank members having a first end fastened to the third post and a second end fastened to the fourth post such that each plank member of the second one or more plank members is virtually horizontally disposed and virtually positioned parallel to the other plank members of the second one or more plank members;
   wherein the third post having a plurality of openings therethrough for insertion and receipt of the first plurality of arm bars therethrough, with each arm bar of the first plurality of arm bars inserted only through a specific one of the plurality of openings of the third post;
   wherein the fourth post having a plurality of openings therethrough for insertion and receipt of the second plurality of arm bars therethrough, with each arm bar of the second plurality of arm bars inserted only through a specific one of the plurality of openings of the fourth post;
   wherein once the freestanding storage rack has been fully assembled in a subsequent disassembled storage rack configuration each plank member of the second one or more plank members remains fastened to the third post and the fourth post.

6. The freestanding storage rack of claim 1 wherein the first ends of the first plurality of arm bars extend in length at a sufficient distance beyond the back portion of the first side frame and the first ends of the second plurality of arm bars extend in length at a sufficient distance beyond the front portion of the first side frame such that a plurality of object storage areas are defined to the left of the first side frame and the second ends of the first plurality of arm bars extend in length at a sufficient distance beyond the back portion of the second side frame and the second ends of the second plurality of arm bars extend in length at a sufficient distance beyond the front portion of the second side frame such that a plurality of object storage areas are defined to the right of the second side frame; wherein the back portion of the first side frame is independent from the back portion of the second side frame such that at least three separate and divided back object storage areas are provided along each arm bar of the first plurality of arm bars; wherein the front portion of the first side frame is independent from front portion of the second side frame such that at least three separate and divided front storage areas are provided along each arm bar of the second plurality of arm bars.

7. The freestanding storage rack of claim 1 wherein the object is a watercraft.

8. The freestanding storage rack of claim 7 wherein the watercraft is a standup paddleboard, kayak, canoe or surfboard.

9. The freestanding storage rack of claim 6 further comprising:
   a third plurality of rotating tubes, each rotating tube of the third plurality of rotating tubes disposed around and enclosing a portion of one arm bar in a freely rotating configuration from the first plurality of arm bars extending to the left of the first side frame left and serving as a freely rotating exterior roller for aiding in loading an object for storage by the storage rack such that the object is adapted to rest on a portion of an arm bar of the first plurality of arm bars and on a portion of an arm bar of the second plurality of arm bars that is horizontally aligned with the arm bar of the first plurality of arm bars to the left of the first side frame; wherein each rotating tube of the third plurality of rotating tubes freely rotating around the arm bar portion it is enclosing;
   a fourth plurality of rotating tubes, each rotating tube of the fourth plurality of rotating tubes disposed around and enclosing a portion of one arm bar from the first plurality of arm bars extending to the right of the second side frame and serving as a freely rotating exterior roller for aiding in loading an object for storage by the storage rack such that the object is adapted to rest on a portion of an arm bar of the first plurality of arm bars and on a portion of an arm bar of the second plurality of arm bars that is horizontally aligned with the arm bar of the first plurality of arm bars to the right of the second side frame; wherein each rotating tube of the fourth plurality of rotating tubes freely rotating over the arm bar portion it is enclosing;
   a fifth plurality of rotating tubes, each rotating tube of the first plurality of rotating tubes disposed around and enclosing a portion of one arm bar in a freely rotating configuration from the second plurality of arm bars extending to the left of the first side frame left and serving as a freely rotating exterior roller for aiding in loading an object for storage by the storage rack such that the object is adapted to rest on a portion of an arm bar of the second plurality of arm bars and on a portion of an arm bar of the first plurality of arm bars that is horizontally aligned with the arm bar of the second plurality of arm bars to the left of the first side frame; wherein each rotating tube of the fifth plurality of rotating tubes freely rotating around the arm bar portion it is enclosing; and
   a sixth plurality of rotating tubes, each rotating tube of the sixth plurality of rotating tubes disposed around and enclosing a portion of one arm bar from the second plurality of arm bars extending to the right of the second side frame and serving as a freely rotating exterior roller for aiding in loading an object for storage by the storage rack such that the object is adapted to rest on a portion of an arm bar of the second plurality of arm bars and on a portion of an arm bar of the first plurality of arm bars that is horizontally aligned with the arm bar of the second plurality of arm bars to the right of the second side frame; wherein each rotating tube of the sixth plurality of rotating tubes freely rotating over the arm bar portion it is enclosing.

10. The freestanding storage rack of claim 1 wherein each arm bar of the first plurality of arm bars and the second plurality of arm bars are galvanized steel pipe bars.

11. The freestanding storage rack of claim 1 wherein each rotating tube of the first plurality of rotating tubes are PVC tubing.

12. The freestanding storage rack of claim 9 wherein each rotating tube of the first plurality of rotating tubes, the second plurality of rotating tubes, the third plurality of rotating tubes, the fourth plurality of rotating tubes, the fifth plurality of rotating tubes and the sixth plurality of rotating tubes are PVC tubing.

13. The freestanding storage rack of claim 2 wherein each end cap of the plurality of end caps are PVC end caps.

14. A freestanding storage rack for outdoor use for outside storage of a plurality of watercraft, comprising:
 a first side frame, the first side frame including a first substantially vertically oriented post serving as a back portion of the first side frame and a second substantially vertically oriented post serving as a front portion of the first side frame;
 a second side frame positioned at a distance from the first side frame, the second side frame having a third substantially vertically oriented post serving as a back portion of the second side frame and a fourth substantially vertically oriented post serving as a front portion of the second side frame;
 a first plurality of circular arm bars inserted through both the back portion of the first side frame and the back portion of the second side frame and having a length such that a first end of each bar of the first plurality of arm bars extends outward from the first side frame and a second end of each bar of the first plurality of arm bars extends outward from the second side frame; wherein a middle portion of each bar of the first plurality of arm bars extends from a first inner surface of the back portion of the first side frame and a first inner surface of the back portion of the second side frame and is defined by the distance between the first side frame and the second side frame;
 a second plurality of circular arm bars inserted through both the front portion of the first side frame and the front portion of the second side frame and having a length such that a first end of each bar of the second plurality of arm bars extends outward from the first side frame and a second end of each bar of the second plurality of arm bars extends outward from the second side frame;
 wherein a middle portion of each bar of the second plurality of arm bars extends from a first inner surface of the front portion of the first side frame and a first inner surface of the front portion of the second side frame and is defined by the distance between the first side frame and the second side frame;
 a first plurality of rotating tubes, each rotating tube of the first plurality of rotating tubes disposed around and enclosing a specific middle portion of one arm bar from the first plurality of arm bars and serving as a freely rotating exterior roller for aiding in loading a watercraft for storage by the storage rack such that the watercraft is adapted to rest on a middle portion of an arm bar of the first plurality of arm bars and on a middle portion of an arm bar of the second plurality of arm bars that is horizontally aligned with the arm bar of the first plurality of arm bars; wherein each rotating tube of the first plurality of rotating tubes freely rotating around the arm bar portion it is enclosing;
 wherein a length of each rotating tube of the first plurality of rotating tubes is virtually a same length as the specific middle portion it is disposed around and enclosing;
 a second plurality of rotating tubes, each rotating tube of the second plurality of rotating tubes disposed around and enclosing a specific middle portion of one arm bar in a freely rotating configuration from the second plurality of arm bars and serving as a freely rotating exterior roller for aiding in loading an object for storage by the storage rack, wherein a length of each rotating tube of the second plurality of rotating tubes is virtually a same length as the specific middle portion it is disposed around and enclosing;
 and
 a plurality of end caps, each end cap from the plurality of end caps is secured to either a first end or a second end of an arm bar of the first plurality of arm bars or a first end or a second end of an arm bar of the second plurality of arm bars such that each end of the first plurality of arm bars and the second plurality of arm bars are covered by an associated end cap;
 wherein tightening the plurality of end caps results in a stiffened storage rack configuration;
 wherein the object is adapted to rest on the freely rotating tube disposed around the middle portion of the one arm bar of the first plurality of arm bars and on the freely rotating tube disposed around the middle portion of the one arm bar of the second plurality of arm bars that is horizontally aligned with the one arm bar of the first plurality of arm bars; wherein each rotating tube of the first plurality of rotating tubes freely rotating around the arm bar portion it is disposed around and each rotating tube of the second plurality of rotating tubes freely rotating around the arm bar portion it is disposed around.

15. The freestanding storage rack of claim 14 wherein each first end of each arm bar of the first plurality of arm bars and of each arm bar of the second plurality of arm bars is threaded and each second end of each arm bar of the first plurality of arm bars and of each arm bar of the second plurality of arm bars is threaded; wherein each end cap of the plurality of end caps having internal threads for mating with a threaded first end or a threaded second end of an associated arm bar from the first plurality of arm bars or the second plurality of arm bars.

16. The freestanding storage rack of claim 14 wherein the first side frame further comprising:
 a first plurality of plank members, each plank member of the first plurality of plank members having a first end fastened to the first post and a second end fastened to the second post such that each plank member of the first one or more plank members is virtually horizontally disposed and virtually positioned parallel to the other plank members of the first one or more plank members;
 wherein the first post having a plurality of openings therethrough for insertion and receipt of the first plurality of arm bars therethrough, with each arm bar of the first plurality of arm bars inserted only through a specific one of the plurality of openings of the first post;
 wherein the second post having a plurality of openings therethrough for insertion and receipt of the second plurality of arm bars therethrough, with each arm bar of the second plurality of arm bars inserted only through a specific one of the plurality of openings of the second post;
 wherein the second side frame further comprising:
 a second plurality of plank members, each plank member of the second plurality of plank members having a first end fastened to the third post and a second end fastened to the fourth post such that each plank member of the second one or more plank members is virtually horizontally disposed and virtually positioned parallel to the other plank members of the second one or more plank members;
 wherein the third post having a plurality of openings therethrough for insertion and receipt of the first plurality of arm bars therethrough, with each arm bar of the first plurality of arm bars inserted only through a specific one of the plurality of openings of the third post;

wherein the fourth post having a plurality of openings therethrough for insertion and receipt of the second plurality of arm bars therethrough, with each arm bar of the second plurality of arm bars inserted only through a specific one of the plurality of openings of the fourth post, wherein once the freestanding storage rack has been fully assembled in a subsequent disassembled storage rack configuration each plank member of the first one or more plank members remains fastened to the first post and the second post and each plank of the second one or more plank members remains fastened to the third post and fourth post.

17. The freestanding storage rack of claim 14 wherein the first ends of the first plurality of arm bars extend in length at a sufficient distance beyond the back portion of the first side frame and the first ends of the second plurality of arm bars extend in length at a sufficient distance beyond the front portion of the first side frame such that a plurality of watercraft storage areas are defined to the left of the first side frame and the second ends of the first plurality of arm bars extend in length at a sufficient distance beyond the back portion of the second side frame and the second ends of the second plurality of arm bars extend in length at a sufficient distance beyond the front portion of the second side frame such that a plurality of object storage areas are defined to the right of the second side frame; wherein the back portion of the first side frame is independent from the back portion of the second side frame such that at least three separate and divided back object storage areas are provided along each arm bar of the first plurality of arm bars; wherein the front portion of the first side frame is independent from front portion of the second side frame such that at least three separate and divided front storage areas are provided along each arm bar of the second plurality of arm bars.

18. The freestanding storage rack of claim 14 wherein the watercraft is a standup paddleboard, kayak, canoe or surfboard.

19. The freestanding storage rack of claim 14 further comprising:
a third plurality of rotating tubes, each rotating tube of the third plurality of rotating tubes disposed around and enclosing a portion of one arm bar in a freely rotating configuration from the first plurality of arm bars extending to the left of the first side frame left and serving as a freely rotating exterior roller for aiding in loading an object for storage by the storage rack such that the object is adapted to rest on a portion of an arm bar of the first plurality of arm bars and on a portion of an arm bar of the second plurality of arm bars that is horizontally aligned with the arm bar of the first plurality of arm bars to the left of the first side frame; wherein each rotating tube of the third plurality of rotating tubes freely rotating around the arm bar portion it is enclosing;

a fourth plurality of rotating tubes, each rotating tube of the fourth plurality of rotating tubes disposed around and enclosing a portion of one arm bar from the first plurality of arm bars extending to the right of the second side frame and serving as a freely rotating exterior roller for aiding in loading an object for storage by the storage rack such that the object is adapted to rest on a portion of an arm bar of the first plurality of arm bars and on a portion of an arm bar of the second plurality of arm bars that is horizontally aligned with the arm bar of the first plurality of arm bars to the right of the second side frame; wherein each rotating tube of the fourth plurality of rotating tubes freely rotating over the arm bar portion it is enclosing;

a fifth plurality of rotating tubes, each rotating tube of the first plurality of rotating tubes disposed around and enclosing a portion of one arm bar in a freely rotating configuration from the second plurality of arm bars extending to the left of the first side frame left and serving as a freely rotating exterior roller for aiding in loading an object for storage by the storage rack such that the object is adapted to rest on a portion of an arm bar of the second plurality of arm bars and on a portion of an arm bar of the first plurality of arm bars that is horizontally aligned with the arm bar of the second plurality of arm bars to the left of the first side frame; wherein each rotating tube of the fifth plurality of rotating tubes freely rotating around the arm bar portion it is enclosing; and a sixth plurality of rotating tubes, each rotating tube of the sixth plurality of rotating tubes disposed around and enclosing a portion of one arm bar from the second plurality of arm bars extending to the right of the second side frame and serving as a freely rotating exterior roller for aiding in loading an object for storage by the storage rack such that the object is adapted to rest on a portion of an arm bar of the second plurality of arm bars and on a portion of an arm bar of the first plurality of arm bars that is horizontally aligned with the arm bar of the second plurality of arm bars to the right of the second side frame; wherein each rotating tube of the sixth plurality of rotating tubes freely rotating over the arm bar portion it is enclosing.

20. The freestanding storage rack of claim 19 wherein each arm bar of the first plurality of arm bars and the second plurality of arm bars are galvanized steel pipe bars; wherein each rotating tube of the first plurality of rotating tubes, the second plurality of rotating tubes and the third plurality of rotating tubes are PVC tubing; wherein each end cap of the plurality of end caps are PVC end caps.

* * * * *